April 22, 1969 S. HONIG 3,440,451

TIME DELAY CIRCUIT

Filed Oct. 12, 1965

INVENTOR
STEVEN HONIG
BY
Delbert P Warner
ATTORNEY

United States Patent Office 3,440,451

Patented Apr. 22, 1969

3,440,451

TIME DELAY CIRCUIT

Steven Honig, Milan, Tenn., assignor to International Telephone and Telegraph Corporation, New York, N.Y., a corporation of Maryland Filed Oct. 12, 1965, Ser. No. 495,292
Int. Cl. H03k *17/28, 17/26*
U.S. Cl. 307—293 4 Claims This invention relates to the provision of time delays and particularly to electronic means for providing a selected time delay between the closure of a switch and the operation of a relay.

The prior art includes many time delay devices making use of the characteristics of a capacitor and a resistor in a series circuit. When there is a need for a delay between the time a potential is received and the time a relay is operated, it is a common practice to employ a resistor in series with a capacitor and to place the coil of the relay in shunt across the condenser. The state of the relay in such a case will remain unchanged until the capacitor charges to a high enough value for the relay to operate. An obvious limitation of such circuits is that the resistance of the relay becomes a part of the time delay circuit and affect the time delay.

It is a common practice with such simple circuits to employ an amplifier presenting a high impedance between the charging network and the relay to isolate the relay impedance from the charging network. The resulting isolation between parts of the circuit improves performance, but such circuits generally suffer from other defects such as being cumbersome, expensive, requiring many components, not being adjustable over a wide range, or not providing an adequate maximum time delay.

It is a primary object, therefore, of this invention to provide means for augmenting the time delay available from an RC circuit.

The foregoing objects and others ancillary thereto may be attained with a preferred embodiment of the invention by inserting an amplifier into a resistor and capacitor circuit in such a way that the RC time constant is multiplied by the gain of the amplifier.

Figure 1:
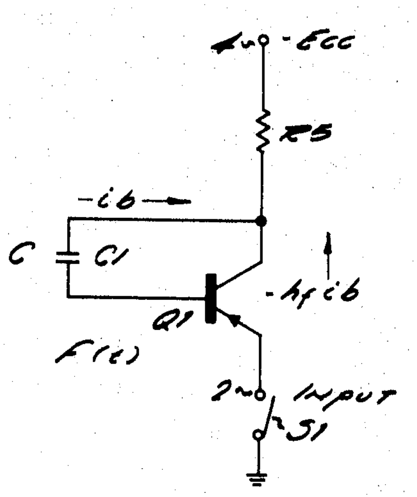
Figure 2:
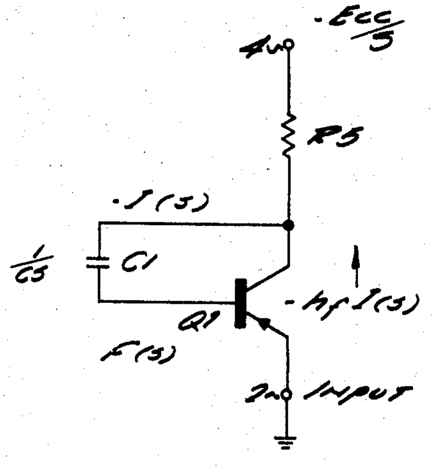
Figure 3:
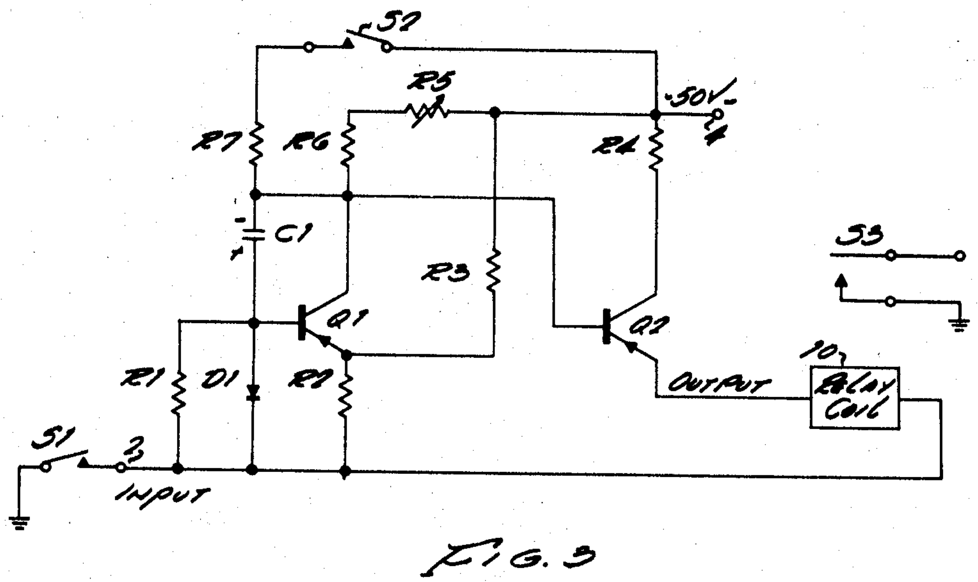

The above mentioned and other objects of this invention and the manner of attaining them will become more apparent, and the invention itself will be better understood by reference to the following descriptions of embodiments of the invention taken in conjunction with the accompanying drawings, in which:

FIG. 1 is a simplified diagram of an embodiment of the invention to illustrate the principles behind the invention, FIG. 2 is a Laplace circuit presented to enable further exposition of the nature of the invention, and FIG. 3 is a circuit diagram showing a detailed embodiment of the invention.

The nature of this invention will be more readily understood from consideration of simplified diagrams, such as those shown in FIG. 1 and FIG. 2, together with the mathematical relationships of the respective components shown in the diagrams. Transistor Q1, resistor R5 and capacitor C1 determine the time constant of the circuit illustrated in FIG. 1. A potential is applied to a terminal 4 such that closure of switch S1 to apply ground to terminal 2 induces the illustrated voltage and current relationships. The relationships shown in FIG. 1 may be rewritten in a Laplace circuit of the form shown in FIG. 2.

Mathematically, the relationship between the components, the currents, and the voltages as shown in FIG. 2 may be expressed by the following equation:

$$-\frac{Ecc}{S}=(-I_{(S)}-h_F I_{(S)})R-I_{(S)}\frac{1}{CS}-V_{BE/S} \quad (1)$$

where $$-\frac{Ecc}{S}$$

represents the source voltage, $(-I_{(S)}-h_F I_{(S)})R$ represents the voltage drop across R5 caused by the branch currents represented by terms $I_{(S)}$ and $h_F I_{(S)}$, $$-I_{(S)}\frac{1}{CS}$$

represents the voltage drop across the capacitor C1, and $V_{BE/S}$ represents the voltage drop in the emitter-base circuits of the transistor Q1.

The final term $V_{BE/S}$ is very small compared to the value of *Ecc/s* and may be dropped. Rewritting Equation 1 as a positive equation will produce equation:

$$\frac{Ecc}{S}=(I_{(S)}+h_F I_{(S)})R+I_{(S)}\frac{1}{CS} \quad (2)$$

A succession of algebraic manipulations may be performed, which should be evident from inspection, to derive the following series of equations:

$$\frac{Ecc}{S}=I_{(S)}(h_F+1)R+I_{(S)}\frac{1}{CS} \quad (3)$$

$$\frac{Ecc}{S}=I_{(S)}\left[(h_F+1)R+\frac{1}{CS}\right] \quad (4)$$

$$I_{(S)}=\frac{Ecc}{S}\,\frac{1}{\left[(h_F+1)R+\frac{1}{CS}\right]} \quad (5)$$

$$I_{(S)}=\frac{Ecc}{(h_F+1)RS+\frac{1}{C}} \quad (6)$$

$$I_{(S)}=\frac{Ecc/R(h_F+1)}{S+\frac{1}{RC(h_F+1)}} \quad (7)$$

Equation 7 is in the form of $$F_{(S)}=\frac{1}{S+A} \quad (8)$$

A Laplace transform of Equation 8 may be written as follows:

$$F_{(t)}=\epsilon^{-at} \quad (9)$$

The inverse transform of Equation 9 becomes:

$$i_b=\frac{Ecc}{R(h_F+1)}\epsilon^{-\frac{t}{RC(h_F+1)}} \quad (10)$$

From FIG. 1 it may be noted that the capacitor is charged by $i_b$ and Equation 10 indicates that the circuit has a time constant which may be expressed by:

$$RC(h_{F+1}) \quad (11)$$

The simplified circuit of FIG. 1 may be embodied in a more practical circuit such as is illustrated in FIG. 3. In accordance with the considerations pointed out above, when the switch S1 is closed placing a ground through the input terminal 2, a potential of minus 50 volts will be impressed across the circuit between terminals 4 and terminal 2. The capacitor C1 will begin to charge through the resistors R5 and R6 and the transistor Q1 in accordance with the following time constant:

$$(R_5+R_6)C_1H_{FE_1} \quad (12)$$

Current will enter the base of Q1 to turn the transistor on and create a temporary low impedance across the terminals of the capacitor. This low impedance of the transistor will shunt, or divert, current from the capacitor and reduce the flow of current which would otherwise be available to charge the capacitor. The voltage across the capacitor builds up at a rate determined by the relationships indicated in Equation 12 and this increase in potential is reflected by a corresponding increase in potential across the terminals of the relay coil 10. When the voltage across the relay coil reaches a critical level, the relay will operate to close the contacts S3.

The transistor Q2 of FIG. 3 serves merely to provide isolation between the relay coil 10 and the charging network. Q2 is basically an emitter-follower with a collector resistor R4 which serves to limit power dissipation. The resistors R1, R2, and R3 and the diode D1 serve to stabilize the operation of the transistor Q1. In addition, D1 also serves to discharge the capacitor C1 after ground on the terminal 2 has been removed, thereby permitting the circuit to return to the nonoperate state quickly.

The operation of the timer can be extended to provide a wide range of time delays. The time delay available can be varied over wide ranges by adjustment of the potentiometer R5. In addition, other values of time delay may be achieved by connecting shunt resistors such as R7 across the circuit by closing the switch S2. The effect of adding a shunt resistor in parallel to R5 and R6 is, of course, to reduce the total resistance which in turn will shorten the time delay.

The input potential to transistor Q2 is supplied through resistors R5 and R6 from terminal 4. The variable resistor R5 should be selected so that, for the largest desired time constant, sufficient current will be available to the base of Q2 to cause it to saturate for the relay coil specified. Q2 merely provides isolation between the charging network and the relay coil. R4 is selected to assure saturation of Q2.

The resistors R2 and R3 provide a reverse bias on transistor Q1. R1 is designed to maintain reverse bias on Q1 during periods of maximum leakage of Q1 at a specified temperature. The fixed resistor R6 is placed in series with the potentiometer in order to make it possible to utilize a potentiometer of small mechanical size and low power. In a typical example, R6 was selected so that R5 would dissipate less than 200 milliwats and R6 would not seriously change the minimum time delay available.

While the principles of the invention have been described above in connection with specific apparatus and applications, it is to be understood that this description is made only by way of example and not as a limitation on the scope of the invention.

What is claimed is:

1. A time delay circuit comprising a resistor, a capacitor and a first transistor coupled together between a voltage supply and a switch, said transistor having a base, a collector and an emitter terminal, means connecting said base terminal to said switch, means connecting said collector terminal and said base terminal to separate terminals of said capacitor, means connecting said resistor between said collector terminal and said voltage supply, a second transistor having a base terminal and a collector terminal, means connecting the collector terminal of said first transistor to the base terminal of said second transistor, and a relay coil connected between the emitter terminal of said second transistor and the switch, whereby the first transistor functions to multiply the delay time inherent in the combination of the resistor and the capacitor by a magnitude proportional to the current gain of the first transistor, and the second transistor functions to isolate a signal applied to its input terminal from the signal appearing on its output terminal.

2. A time delay circuit substantially as claimed in claim 1, in which said switch has a terminal coupled to ground, and said switch, upon being closed, applies ground to the input terminal of said first amplifier.

3. A time delay circuit substantially as claimed in claim 1, in which said resistor includes a variable element to enable changes to be made in the length of the time delay.

4. A time delay circuit substantially as claimed in claim 1, including a shunt path connectable in parallel with said resistor to enable changes to be made in said time delay.

References Cited

UNITED STATES PATENTS

| | | | |
|---|---|---|---|
| 2,405,843 | 7/1946 | Moe | 328—67 |
| 2,585,093 | 2/1952 | Creamer | 328—67 |
| 2,651,719 | 9/1953 | White | 328—128 |
| 2,692,334 | 10/1954 | Blumlein | 328—128 |
| 2,872,571 | 2/1959 | Lenz | 328—67 |
| 2,958,017 | 10/1960 | Hogue | 307—293 |
| 3,104,331 | 9/1963 | Zinke | 307—293 |
| 3,315,101 | 4/1967 | Smith | 328—67 |

OTHER REFERENCES

Massachusetts Institute of Technology, Radiation Laboratory Series, vol. 19, "Waveforms" (1949) First Edition pp. 35–39.

ARTHUR GAUSS, *Primary Examiner.*

HAROLD DIXON, *Assistant Examiner.*

U.S. Cl. X.R.

328—128; 317—148.5